United States Patent Office 3,312,655
Patented Apr. 4, 1967

3,312,655
COLORING OF THERMOPLASTIC RESINS
Chi K. Dien, Buffalo, N.Y., assignor to Allied Chemical Corporation, New York, N.Y., a corporation of New York
No Drawing. Filed Feb. 13, 1963, Ser. No. 258,158
12 Claims. (Cl. 260—41)

This invention relates to the pigmenting or coloring of thermoplastic resins. It relates more particularly to the coloring of synthetic thermoplastic resins which in the normal form (that is, in the uncolored form usually obtained in commercial manufacture or on the market) are clear, substantially water-white, glass-like solids and especially those which are also polymers of unsaturated organic compounds, such as polystyrene and polymethylmethacrylate.

The class of synthetic thermoplastic resins, which includes such polymeric materials as polystyrene, polymethylmethacrylate, polyvinyl chloride and vinylidene chloride polymers and copolymers, polyethylene, polypropylene, fluorohydrocarbon polymers, silicons, cellulosic esters and ethers, comprises a large and commercially valuable class of synthetic materials. Because of the characteristic property of flowing under the application of heat and pressure, plastic substances of this class are used extensively in molding and extrusion processes to form a myriad of useful articles, many of which are colored.

The range of colorants suitable for coloring such resins is very limited, however, particularly in connection with the production of clear, glass-like colored products. In general, the conditions currently employed in processing such thermoplastic resins are too drastic for most organic pigments, especially in view of the trend toward the use of higher processing temperatures and pressures; organic colorants formerly capable of withstanding the processing conditions without noticeable shade alteration or loss of other fastness properties have proven to be incapable of meeting current demands. Furthermore, due to reactions between the organic pigment and the polymerization catalysts, antioxidants, preservatives, fungicides, vulcanizates, and other special additives employed with the resins, which have become increasingly important as the processing conditions have been made more severe, the need for suitable pigments has increased greatly.

While inorganic substances, such as carbon black, iron oxides and the like have been used to impart color to thermoplastic resins, such inorganic pigments give colorations lacking in brightness and clarity, which are desirable in many thermoplastic resin applications.

An object of the present invention is to provide colored synthetic thermoplastic resin compositions which do not undergo shade alteration upon exposure to high temperatures, e.g., up to about 700° F.

Another object of the invention is to provide synthetic thermoplastic resins which are colored pink to red shades that do not undergo shade alteration during forming operation at such high temperatures and which are fast to light.

A specific object of the invention is to provide polystyrene and polymethylmethacrylate resin compositions which are colored pink to red shades that are characterized by heat stability, lightfastness, brightness and clarity. esses for the preparation of such colored thermoplastic resins.

Other objects of the invention in part will be obvious and in part will appear hereinafter.

According to the present invention, the above objects are accomplished by incorporating 1-cyclohexylamino-anthraquinone in the synthetic thermoplastic resin as a pigment or colorant.

I have discovered that 1-cyclohexylamino-anthraquinone, which is represented by the structural formula

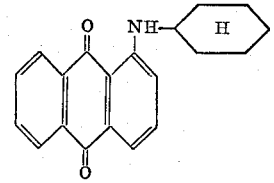

is an unexpectedly superior colorant or pigment for synthetic thermoplastic resins, particularly of the type referred to above, more particularly those which are obtained by polymerization of an unsaturated organic monomer, and especially those which in the normal form are clear, substantially water-white, glass-like solids.

Thus, I have found that 1-cyclohexylamino-anthraquinone colors such resins in pleasing and desirable bright shades ranging from pink to deep red which have excellent fasteness to light and to weathering, which are stable to processing or forming operations at high temperatures (e.g. up to 700° F.), such as molding, spinning, extrusion, and the like, and in the presence of additives such as peroxides. It does not change color when mixed with the thermoplastic resins, or with the monomers from which they are obtainable, and the mixtures are processed under said usual elevated temperature and pressure conditions. Moreover, this unique colorant does not exhibit any anti-catalytic effect when used with monomeric substances, e.g., methylmethacrylate, and is not itself adversely affected by the catalysts used in the polymerization.

An outstanding advantageous property of 1-cyclohexyl-amino-anthraquinone is its solubility in said resins, as well as in many of the common organic solvents used in commercial manufacture, for example, acetone, toluene and ethyl acetate. As a result, resins which in the normal form are clear, glass-like solids, and especially polystyrene and polymethylmethacrylate, form clear, pink to red-colored glass-like products which do not change color on exposure to sunlight or on weathering and which retain their gloss and clarity.

This result is surprising, because closely related anthraquinone compounds have been found to be unsuitable for these purposes. Thus, 1-methylamino-anthraquinone, a commercial coloring agent which produces similar red colorations, is unsuitable for use in the production of colored glass substitutes because of lack of sufficient light-fastness; the resulting colored plastic objects fade upon exposure to sunlight. Moreover, 1-methylamino-anthraquinone is poorly soluble in many of the organic solvents commonly used in industry (such as acetone, toluene and ethyl acetate) which limits its usefulness as a coloring agent. Similarly, other cyclohexyl derivatives of amino-anthraquinones, for example, 5-cyclohexylamino-1-methylamino-anthraquinone, 1,4-bis-cyclohexylamino-anthraquinone, 1,5-bis-cyclohexylamino-anthraquinone and 1,8-bis-cyclohexylamino-anthraquinone, are not only deficient in lightfastness but in some cases also lack adequate heat stability.

1-cyclohexylamino-anthraquinone is a known compound which can be prepared by several known processes. For example, it can be obtained by heating 1-chloro-anthraquinone (or the corresponding anthraquinone nitro or sulfonic acid derivative) with cyclohexylamine in a boiling solvent (e.g., butanol) in the presence of a catalyst (e.g., copper acetate) and an acid binding agent (e.g., potassium carbonate). Or it can be obtained by heating a mixture of 1-aminoanthraquinone, bromocyclohexane and nitrobenzene in the presence of copper powder, as set out in British Patent 261,764. The resulting 1-cyclohexylamino-anthraquinone is readily isolated from these reaction mixtures and, if necessary, can be purified by recrystallization. The product melting at 135° to 137° C. is satisfactory for use as a colorant in accordance with the present invention. Preferably it is used in a finely divided state, which can be obtained in known manner; as by micropulverizing, salt grinding, and the like.

The incorporation of the cyclohexylamino-anthraquinone in the resin can be accomplished by known methods. For example, pellets or beads or rods (the usually available commercial forms) of the resin polymer can be surface coated by mixing with the comminuted pigment in a suitable mixer and feeding the thus coated resin to a suitable molding press, extruder or fiber spinner. Alternatively, an aqueous paste of 1-cyclohexylamino-anthraquinone can be admixed with the polymer in comminuted form and then dried, and the dried mix, after additional mixing if desired (for example, in a ribbon mixer), fed to a molding press, etc. Or the cyclohexylamino-anthraquinone can be dissolved or suspended in the monomer and the resulting mixture polymerized and formed, in one or separate operations, as is customary.

In accordance with a preferred mode of carrying out my invention, a mixture of 1-cyclohexylamino-anthraquinone, in essentially pure condition and in finely divided state, is admixed with granular polystyrene or polymethacrylate; the mixture is tumbled to surface coat the resin with pigment, and is then fed to a suitable molding or extrusion apparatus operating at a suitable temperature between about 300° and about 700° F. The resulting colored products are clear, bright reddish colored articles which show no evidence of shade alteration and which are exceptionally fast to light.

In accordance with another method of procedure, the 1-cyclohexylamino-anthraquinone is dissolved in the monomer form of the desired thermoplastic resin (e.g., monomethylmethacrylate) containing a suitable polymerization catalyst and the solution is heated to induce polymerization in the usual manner. The resultant polymer can be formed in any suitable manner (e.g., extruded, molded, spun, and the like), as by molding or extrusion in the above manner. The formed articles thus obtained have properties substantially identical with those formed by pigmenting the polymer.

The amount of 1-cyclohexylamino-anthraquinone which can be incorporated in the resin composition (thermoplastic resin or monomer) can vary over a wide range. The particular amount used is dependent upon the depth of shade or coloration desired. The invention contemplates the addition of colorant in the range from extremely minute amounts to extremely large amounts which are limited only by the compatibility of the cyclohexylamino-anthraquinone and the particular resin being colored, and which may vary to a considerable degree from resin to resin, as will be evident to those skilled in this art.

Thus, for light tints (for example, for finished pieces) amounts as low as 0.0001 part per 100 parts by weight of the resin or resin composition are sufficient. For deep shades or for master batches and the like, amounts up to 5.0 parts or more are used per 100 parts by weight of resin composition. Thus, master batches can be prepared by addition of 1-cyclohexylamino-anthraquinone to the resin monomer or polymer in amounts of about 0.5 to about 5.0 parts, preferably from about 1.0 to about 3.0 parts, per 100 parts of resin composition. Products of any desired lighter shade then can be obtained by mixing the colored master batch with unpigmented resin and further processing the mixture, e.g., molding, extruding, spinning, etc.

The invention will be illustrated by the following specific examples, but it is to be distinctly understood that the invention is not to be limited to the details thereof. Parts and percentages are by weight and temperatures are in degrees Fahrenheit.

EXAMPLE 1

A mixture of 100 parts of polystyrene pellets and 0.05 part of 1-cyclohexylamino-anthraquinone in the form of a fine powder was placed in a covered metal container and tumbled mechanically for 5 minutes to surface coat the resin with the powder. Thereafter, the coated resin was fed to a laboratory extruder, operating at 600° and slow speed, and extruded in the form of a clear red, continuous rod ⅛" in diameter. The rod showed no alteration in shade during, or as a result of, the heating and extrusion operation. The rod was then pelletized, and the pellets were fed to an injection molding apparatus operating at about 400° and cast into a clear, red, glass-like plaque approximately 2" x 3" x ¼". To test its lightfastness, the plaque was exposed in a Fade-Ometer for 160 hours. The alteration in shade was practically nil.

For purposes of comparison a similar plaque of polystyrene was pigmented to approximately the same shade with 1-methylaminoanthraquinone in the same manner. After 20-46 hours' exposure in the Fade-Ometer, the resulting plaque showed alteration in shade, and after 160 hours' exposure it was rated considerably yellower and weaker.

EXAMPLE 2

The procedure of above Example 1 was repeated with a commercial polymethylmethacrylate resin (Plexiglas—Color 100, Formula A). The surface-coated resin was extruded at about 350°, and the clear red pellets of pigmented polymer were molded at about 325°. The pigmented resin showed no alteration in shade on extrusion at the relatively high temperature used (350°), and the clear, red, glass-like molded plaque showed no noticeable change in shade when exposed for 320 hours in the Fade-Ometer.

By comparison, a similar plaque of polymethylmethacrylate resin which had been colored substantially the same shade with 1-methylaminoanthraquinone underwent a definite shade alteration (it became darker and weaker) when exposed for 320 hours in the Fade-Ometer.

EXAMPLE 3

A mixture of 100 parts of monomethylmethacrylate monomer, 0.1 part of benzoyl peroxide and 0.1 part of 1-cyclohexylamino-anthraquinone was heated on a steam bath until vigorous boiling occurred. The mixture was removed from the steam bath and, after the vigorous reaction had subsided, was placed in a warm (140°) oven for about 16 hours. The polymerization reaction was completed by heating the mixture on the steam bath for 1 hour. The resulting red-colored polymethylmethacrylate resin was then extruded into rods as described in Example 2 above.

The presence of the 1-cyclohexylamino-anthraquinone did not interfere with the polymerization reaction to any noticeable extent, nor did the presence of the benzoyl peroxide cause any alteration in the shade of the colored resin.

It will be evident to those skilled in the art that the invention is not limited to the details of the above specific examples and that changes can be made without departing from the scope of the invention.

Thus, the temperatures employed in practicing the processes of the examples can be varied. For example, temperatures within the range from about 400° to about 600° F. can be used with polystyrene; and temperatures from about 300° to about 400° F. can be used with polymethylmethacrylate. And in producing a colored polymer by polymerization, temperatures between about 120° F. and about 300° F. are employed with styrene and temperatures between about 100° F. and about 250° F. are employed with monomethylmethacrylate.

Instead of the resins employed in Examples 1 and 2, other synthetic thermoplastic resins may be treated in like manner; such as, polyethylene, polypropylene, polybutylene, fluorine containing polymers, polyvinyl chloride, polyvinyl copolymers, polyacrylonitrile and acrylonitrile copolymers, polycondensates (for example, polyamides such as the nylons and polyesters such as the terephthalates), silicones, and cellulose esters and ethers.

The colored resin products can be produced in the form of articles of various shapes and sizes, including molded pieces, sheets, films, fibers, filaments, etc.

I claim:

1. A colored synthetic thermoplastic resin containing 1-cyclohexylamino-anthraquinone in sufficient amount to impart color thereto.

2. A colored synthetic thermoplastic resin which in the normal form is a clear substantially water-white, glass-like solid containing, as a coloring agent, 0.0001 to 5 parts of 1-cyclohexylamino-anthroquinone per 100 parts by weight of resin, said resin being colored a clear, bright pink to red shade having excellent fastness to light.

3. A colored synthetic resin as defined in claim 2, wherein the resin is polystyrene.

4. A colored synthetic resin as defined in claim 2, wherein the resin is polymethylmethacrylate.

5. The process of imparting a bright, light-fast pink to red color to a synthetic thermoplastic resin which comprises incorporating 1 - cyclohexylamino-anthraquinone in said resin in at least sufficient amount to impart a pink color to said resin.

6. The process of imparting a bright, light-fast pink to red color to a synthetic thermoplastic resin which comprises associating 1-cyclohexylamino-anthraquinone with a synthetic thermoplastic resin in at least sufficient amount to impart a pink color to said resin and subjecting the resulting resin to a forming operation at a temperature between about 300° and about 700° F.

7. The process of imparting a bright, light-fast pink to red color to a synthetic thermoplastic resin which in the normal form is a clear substantially water-white, glass-like solid which comprises surface coating said resin with 1-cyclohexylamino-anthraquinone in at least sufficient amount to impart a pink color thereto and subjecting the mixture to heat and pressure at a temperature between about 300° and about 700° F.

8. The process of claim 7 in which the synthetic thermoplastic resin is polystyrene and the temperature is between about 400° and about 600° F.

9. The process of claim 7 in which the synthetic thermoplastic resin is polymethylmethacrylate and the temperature is between about 300° and about 400° F.

10. The process of producing a pink to red colored synthetic thermoplastic resin polymer which in the normal form is a clear substantially water-white, glass-like solid and which can be obtained by polymerizing the corresponding monomer, which comprises mixing 1-cyclohexylamino-anthraquinone with the monomer and heating the resulting mixture under conditions to effect polymerization of the monomer, the amount of 1-cyclohexylamino-anthraquinone being at least sufficient to impart a pink color to said resin.

11. The process as defined in claim 10 in which the monomer is styrene and the polymerization is carried out by heating the mixture to a temperature between about 120° F. and about 300° F.

12. The process as defined in claim 10 in which the monomer is monomethylmethacrylate and the polymerization is carried out by heating the mixture to a temperature between about 100° F. and about 250° F.

References Cited by the Examiner

UNITED STATES PATENTS

| 2,500,023 | 3/1950 | Burk | 260—41 |
| 2,537,334 | 1/1951 | DeNie | 260—91.7 |
| 2,870,172 | 1/1959 | Schoenauer | 260—371 |

FOREIGN PATENTS 261,764  8/1927  Great Britain.

MORRIS LIEBMAN, *Primary Examiner.*

K. B. CLARKE, S. L. FOX, *Assistant Examiners.*